US011741171B2

(12) United States Patent
Kravitz et al.

(10) Patent No.: US 11,741,171 B2
(45) Date of Patent: Aug. 29, 2023

(54) SYSTEM, METHOD AND COMPUTER PROGRAM PRODUCT FOR ALERTING USERS TO WEBSITES NEW TO THE WEB

(71) Applicant: Microsoft Technology Licensing, LLC, Redmond, WA (US)

(72) Inventors: Lillian Rachel Kravitz, Seattle, WA (US); Ryan Gregory Cropp, Seattle, WA (US); David Fang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 148 days.

(21) Appl. No.: 17/227,856

(22) Filed: Apr. 12, 2021

(65) Prior Publication Data

US 2022/0327167 A1 Oct. 13, 2022

(51) Int. Cl.
*G06F 7/02* (2006.01)
*G06F 16/00* (2019.01)
*G06F 16/951* (2019.01)
*G06F 16/9538* (2019.01)

(52) U.S. Cl.
CPC ........ *G06F 16/951* (2019.01); *G06F 16/9538* (2019.01)

(58) Field of Classification Search
CPC ..... G06F 16/951; G06F 16/9538; G06F 16/95
See application file for complete search history.

(56) References Cited

U.S. PATENT DOCUMENTS

| 8,019,689 | B1 | 9/2011 | Nachenberg |
| 8,332,947 | B1 | 12/2012 | Bregman et al. |
| 8,516,377 | B2 | 8/2013 | Dixon et al. |
| 11,388,248 | B1* | 7/2022 | Scotney ................. H04L 67/53 |
| 2006/0253458 | A1* | 11/2006 | Dixon ................. H04L 63/1483 |
| 2014/0040230 | A1* | 2/2014 | Stibel ................... G06Q 30/018 |
| | | | 707/723 |
| 2015/0058167 | A1* | 2/2015 | McLaughlin ...... G06Q 30/0623 |
| | | | 705/26.61 |
| 2018/0069883 | A1* | 3/2018 | Meshi ................. H04L 63/1425 |
| 2018/0262351 | A1* | 9/2018 | Liu ......................... H04L 67/34 |
| 2018/0309713 | A1* | 10/2018 | Brown ................ H04L 61/4511 |

(Continued)

OTHER PUBLICATIONS

"International Search Report and Written Opinion Issued in PCT Application No. PCT/US22/021233", dated Jun. 21, 2022, 10 Pages.

*Primary Examiner* — Bruce M Moser
(74) *Attorney, Agent, or Firm* — Weaver IP L.L.C.

(57) ABSTRACT

A system identifies and alerts a user to websites that are new to the web, for example, based on a purchase date, a transfer of ownership date, network traffic to the website, a reputation of the website, and/or appearance of the website in search results. An alert may be provided before, during and/or after a user navigates to a website. An alert may be provided for a displayed website. One or more alerts may be provided for one or more links to websites in a displayed webpage, such as search engine results. One or more alerts may be provided for one or more links to websites shown in a history or list of recently visited websites. A new to the web label may alert a user to consider whether a website is malicious, aiding a user's determination whether to navigate away from or to avoid navigating to new websites.

20 Claims, 6 Drawing Sheets

(56) References Cited

U.S. PATENT DOCUMENTS

2020/0050707 A1* 2/2020 Tsykynovskyy .... G06F 16/3347
2020/0207093 A1* 7/2020 Nakakubo ............ B41J 2/14233
2020/0226159 A1* 7/2020 Wang .................... G06F 16/953

* cited by examiner

SYSTEM, METHOD AND COMPUTER PROGRAM PRODUCT FOR ALERTING USERS TO WEBSITES NEW TO THE WEB

BACKGROUND

Browsing Internet content, such as websites, comes with risk. Without information about websites to guide their selections, users may navigate to unsafe websites. For example, a user may browse to a website that installs harmful software, called malware, on their computing device. A website may also be designed to trick a user into installing malware on their computing device. Such malware may harm the user's computing device, enable the theft of personal data, enable unauthorized access to a network of computers, or the like. A website may also be designed to engage in phishing for user information, scam users for payments or payment information, and/or other illicit monetization techniques (e.g., cybercrimes).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are provided for distinguishing websites new to the web from other websites. A web browser may identify and alert a user to websites that are new to the web, for example, based on a purchase date, a transfer of ownership date, network traffic to the website, a reputation of the website, and/or appearance of the website in search results. An alert may be provided before, during and/or after a user navigates to a website. Websites and/or links to websites may be accessed in a browser, for example, based on browser website navigation (e.g., user entry or selection of websites), website links shown in displayed websites, search query results (e.g., provided by a search engine), a history of website browsing, a list of recently browsed websites, etc. Websites and website links may be identified for determination as to whether they are new, for example, by a browser, a browser plugin, a proxy, a search engine, etc. A new website service may provide support to browsers, browser plugins, proxy servers, search engines, etc. An alert may be provided for a current (e.g., displayed) website. One or more alerts may be provided for one or more links to websites in a displayed webpage, such as search engine results. One or more alerts may be provided for one or more links to websites shown in a browsing history or a list of recently visited websites. In some cases, a new to the web label may alert a user to consider whether a website is malicious, aiding a user's determination whether to navigate away from or to avoid navigating to websites.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
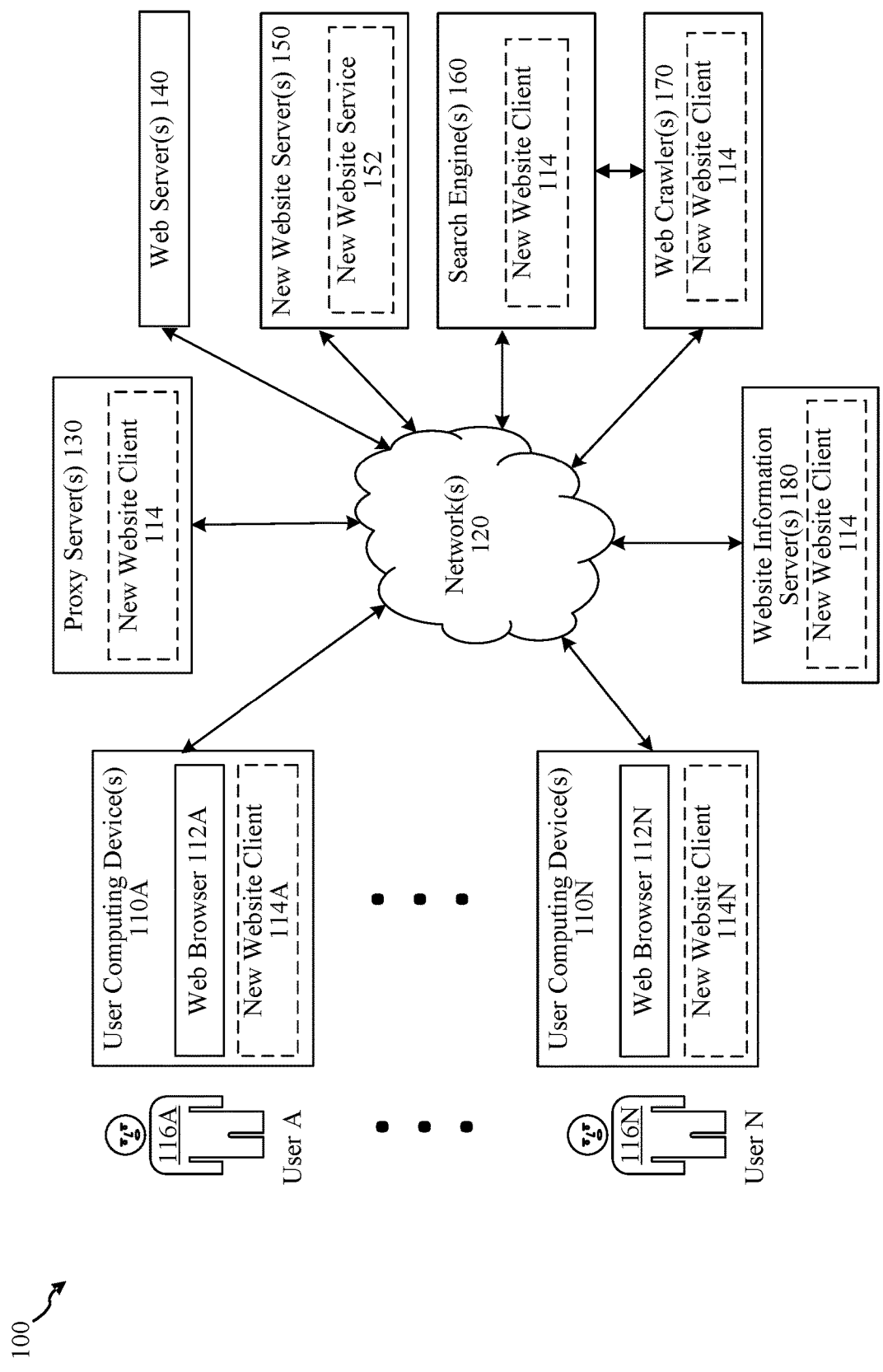
FIG. 1 shows a block diagram of an example system for identifying and providing alerts for websites new to the web, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Methods, systems and computer program products are provided for distinguishing websites new to the web from other websites. A web browser may identify and alert a user to websites that are new to the web, for example, based on a purchase date, a transfer of ownership date, network traffic to the website, a reputation of the website, and/or appearance of the website in search results. An alert may be provided before, during and/or after a user navigates to a website. Websites and/or links to websites may be accessed in a browser, for example, based on browser website navigation (e.g., user entry or selection of websites), website links shown in displayed websites, search query results (e.g., provided by a search engine), a history of website browsing, a list of recently browsed websites, etc. Websites and website links may be identified for determination as to whether they are new, for example, by a browser, a browser plugin, a proxy, a search engine, etc. A new website service may provide support to browsers, browser plugins, proxy servers, search engines, etc. An alert may be provided for a current (e.g., displayed) website. One or more alerts may be provided for one or more links to websites in a displayed webpage, such as search engine results. One or more alerts may be provided for one or more links to websites shown in a browsing history or list of recently-visited websites.

In some cases, a new to the web label may alert a user to consider whether a website is malicious, aiding a user's determination whether to navigate away from or to avoid navigating to websites. For example, by providing a new to the web label, embodiments described herein may help a user avoid browsing to a website that would otherwise install harmful software, called malware, on their computing device. Embodiments described herein may likewise cause a user to avoid a website designed to trick a user into installing malware on their computing device. Consequently, embodiments described herein can advantageously help in avoiding harm to a user's computing device, the theft of personal data, unauthorized access to a network of computers, and the like.

FIG. 1 shows a block diagram of a system for identifying and providing alerts for websites new to the web, according to an example embodiment. Example system 100 presents one of many possible example implementations. System 100 may comprise any number of computing devices (e.g., including servers), such as example components illustrated in FIG. 1 and other additional or alternative devices not expressly illustrated. Other types of computing environments are also contemplated. Example system 100 includes network(s) 120, user computing device(s) 110A-N, proxy server(s) 130, web (e.g., website or content) server(s) 140, new website server(s) 150, search engine(s) 160, web crawler(s) 170 and website information server(s) 180.

Network(s) 120 may include one or more of any of a local area network (LAN), a wide area network (WAN), a personal area network (PAN), a combination of communication networks, such as the Internet, and/or a virtual network. In example implementations, user computing device(s) 110A-N, proxy server(s) 130, web (e.g., website or content) server(s) 140, new website server(s) 150, search engine(s) 160, web crawler(s) 170 and website information server(s) 180 may be communicatively coupled via network(s) 120. In an implementation, any one or more of user computing device(s) 110A-N, proxy server(s) 130, web (e.g., website or content) server(s) 140, new website server(s) 150, search engine(s) 160, web crawler(s) 170 and website information server(s) 180 may communicate (e.g. via network(s) 120) via one or more application programming interfaces (APIs), and/or according to other interfaces and/or techniques. User computing device(s) 110A-N, proxy server(s) 130, web (e.g., website or content) server(s) 140, new website server(s) 150, search engine(s) 160, web crawler(s) 170 and website information server(s) 180 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

User computing device(s) 110A-N may comprise one or more virtual machines, storage devices, servers, operating systems, applications, services, local processes, remote machines, web services, etc. that may be executed, hosted, and/or stored therein or via one or more other computing devices via network(s) 120. Client computing device(s) 110A-N may represent any number of computing devices. Client computing device(s) 110A-N may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Client computing device(s) 110A-N are not limited to physical machines, but may include other types of machines or nodes, such as a virtual machine.

Client computing device(s) 110A-N may comprise, respectively, web browser 112A-N and (e.g., optional) new website client 114A-N. Web browser 112A-N may comprise, for example, a general or specific content browsing application, such as a Web browser application that may be used to display public and/or private content (e.g., based on user credentials) for one or more content providers. In some example implementations, client computing device(s) 110A-N may comprise, respectively, web browser 112A-N and new website client 114A-N. In various examples, new website client 114A-N may or may not be implemented. In some examples, new website client 114A-N may be integrated in web browser 112A-N. In some examples, new website client 114A-N may be an add-on in web browser 112A-N. Web browser 112A and/or new website client 114A-N may perform all or a portion of new website operations (e.g., new website identification, alert generation, new website information, and/or response to user interaction operations). New website client 114A-N may be a client and/or an agent of new website service 152, which may perform one or more operations related to new website identification and/or alert generation operations (e.g., in support of operations by web browser 112A-N and/or new website client 114A-N).

Web (e.g., website or content) server(s) 140 may comprise one or more virtual machines, storage devices, servers, operating systems, applications, services, local processes, remote machines, web services, etc. that may be executed, hosted, and/or stored therein or via one or more other computing devices via network(s) 120. Web server(s) 140 may represent any number of computing devices. Web server(s) 140 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Web server(s) 140 are not limited to physical machines, but may include other types of machines or nodes, such as a virtual machine.

Web server(s) 140 may host content provider websites. Web server(s) 140 may provide digital media content (e.g. webpage content, advertisements, and so on) upon request to web browser 112A-N. In examples, search engines (e.g., search engine(s) 160) may be considered content providers similar to web server(s) 140, given that search engine query results webpages may include website links, text, photos, videos and other content provided in response to user queries. Website links may or may not be links to new websites. Web server(s) 140 may receive requests for content (e.g., uniform resource locator (URL) addresses for webpages) entered into or selected in displayed content via web browsers 112A-N and return the requested content to user computing devices 110A-N.

Proxy server(s) 130 may comprise one or more virtual machines, storage devices, servers, operating systems, applications, services, local processes, remote machines, web services, etc. that may be executed, hosted, and/or stored therein or via one or more other computing devices via network(s) 120. Proxy server(s) 130 may represent any number of computing devices. Proxy server(s) 130 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Proxy server(s) 130 are not limited to physical machines, but may include other types of machines or nodes, such as a virtual machine.

Proxy server(s) 130 may provide one or more proxy services to user computing device(s) 110A-N. Proxy server(s) 130 may operate as an intermediary between user computing device(s) 110A-N and web server(s) 140 and/or search engine(s) 160. In some example implementations, proxy server(s) 130 may comprise new website client 114. New website client 114 may be a client or agent of new website service 152, which may perform one or more operations related to new website identification and/or alert generation operations (e.g., in support of operations by web browser 112A-N, new website client 114A-N, and/or new website client 114). In some examples, new website client 114 (e.g., if implemented) may perform all or a portion of new website operations (e.g., new website identification, alert generation, providing information, marking up webpages), for example, for content requested by user computing device(s) 110A-N and received from web server(s) 140. In examples, proxy server(s) 130 may receive requests for content. In some examples, proxy server(s) 130 may provide marked up content with new website indicators and/or content that may or may not be (e.g., further) processed by new website client 114A-N to determine whether to identify new websites for user A-N 116A-N. Mark ups provided by proxy server(s) 130 may be general (e.g., for multiple users) or specific (e.g., for a particular user). In some examples, new website client 114A-N may comprise a client or agent of new website service 152.

New website server(s) 150 may comprise one or more virtual machines, storage devices, servers, operating systems, applications, services, local processes, remote machines, web services, etc. that may be executed, hosted, and/or stored therein or via one or more other computing devices via network(s) 120. New website server(s) 150 may represent any number of computing devices. New website server(s) 150 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. New website server(s) 150 are not limited to physical machines, but may include other types of machines or nodes, such as a virtual machine.

New website server(s) 150 may provide one or more new website services to user computing device(s) 110A-N and/or to one or more other devices, such as proxy server(s) 130, search engine(s) 160, etc. For example, new website server(s) 150 may comprise new website service 152 to provide one or more new website operations (e.g., new website identification, new website information and/or new website alert services) for user computing device(s) 110A-N, proxy server(s) 130, search engine(s) 160, etc. In various implementations, new website service 152 may perform all or a portion of new website service operations. In some examples, new website service 152 may perform one or more new website service operations in response to new website information requested about content or information requested or received by user computing device(s) 110A-N or proxy server(s) 130 from web server(s) 140 or search engine(s) 160. In some examples, new website service 152 may perform one or more new website service operations in response to new website information requested by search engine(s) 160 about webpage links in search results, etc.

For example, new website server(s) 150 may be called by user computing device(s) 110A-N (e.g., based on operation of web browser 112A-N and/or new website client 114A-N) to process one or more website URLs to determine whether the one or more URLs are associated with new websites. The one or more URLs may be for a requested webpage, a received webpage, a webpage presented by a web browser, URLs in/on or otherwise associated with a requested, received or presented webpage, URLs in a browser history, URLs in recently accessed/closed websites, URLs in query search results, URLs intercepted by a proxy server, etc. For example, user 116A-N may type a webpage address into a search engine address bar or select (e.g., click) a link in a displayed webpage. User computing device(s) 110A-N or proxy server(s) 130 may request the content for the entered or selected URL from web server(s) 140 and may (e.g., also or simultaneously/concurrently) request new website services from new website server(s) 150 based on the URL or content requested from web server(s) 140. User computing device(s) 110A-N or proxy server(s) 130 may receive requested content (e.g., a requested webpage), process the received content to determine links in the content, and call new website service 152 to determine whether the links link to new websites. New website server(s) 150 may receive information (e.g., one or more URLs), access (e.g., lookup or request) and provide new website information. User computing device(s) 110A-N, proxy server(s) 130 or search engine(s) 160 may determine whether websites are new based on website information received from new website server(s) 150 and may generate new website alerts associated with webpages or URLs for new websites. New website server(s) 150 may access (e.g., lookup or request), process the website information, make a determination whether the website in new, and provide the determination (e.g., with or without accompanying website information and with or without a new website alert) to user computing device(s) 110A-N or proxy server(s) 130.

New website server(s) 150 may obtain website information from one or more sources (e.g., search engine(s) 160, web crawler(s) 170, and/or website information server(s) 180). Website information may be used, for example, by new website service 152 or new website client 114 to determine whether a website is new to the web.

For example, new website server(s) 150 (e.g., new website service 152) may access information to determine when a domain (e.g., name) for a website was (e.g., originally) purchased. A recently purchased web domain may indicate a website is new to the web. Domain purchase information may be obtained, for example, from website information server(s) 180 (e.g., whois.com).

New website server(s) 150 (e.g., new website service 152) may access information to determine when a domain for a website was transferred from a former owner to a current owner. A recently transferred web domain may indicate a website is new to the web, at least in terms of ownership. Domain transfer information may be obtained, extracted or inferred, for example, from website information server(s) 180 (e.g., whois.com).

New website server(s) 150 (e.g., new website service 152) may access information to determine the reputation of a website. For example, the lack of a reputation may indicate a website is new to the web. Reputation information for websites may be obtained, for example, from search engine(s) 160 (e.g., Microsoft® Bing®).

New website server(s) 150 (e.g., new website service 152) may access information to determine an amount of network traffic associated with a website. For example, little to no network traffic may indicate a website is new to the web.

New website server(s) 150 (e.g., new website service 152) may access other information to determine whether a website is new to the web. For example, new website server(s) 150 may access an application or service that identifies harmful websites (e.g., Microsoft® SmartScreen®) for information about a website. A lack of available information about a website from such an application or service may support an inference or a probability with a confidence level that a website is new to the web.

Search engine(s) 160 may provide query search results in response to queries provided by users A-N 116A-N through web browsers 112A-N. Search engine(s) 160 may provide search results to proxy server(s) 130 or to user computing device(s) 110A-N. Search engine(s) 160 may provide query results with or without new website information for websites in search results. In some implementations, search engine(s) 160 may determine new websites and provide new website information and/or alerts in search results. In some implementations, web browsers 112A-N and/or new website clients 114A-N may receive new website determinations or designations in search results, e.g., with or without new website alerts and associated new website information. In some implementations, search engine(s) 160 may provide search results without new website determinations or information. Search engine(s) 160 (e.g., via new website client 114) may obtain website information (e.g., including new website information), for example, from web crawler(s) 170, website information server(s) 180 and/or new website server(s) 150. As previously indicated, search engine(s) 160 may use or may provide website information (e.g., website reputation scores) to new website server(s) 150, proxy server(s) 130 and/or user computing device(s) 110A-N for determinations whether a website is new to the web.

Web crawler(s) 170 may crawl the world wide web (WWW or web) to index content for a search engine, e.g., search engine(s) 160. Search engine(s) 160 and/or other components in a new website system (e.g., new website server(s) 150) may retrieve website information from and/or provide website information to web crawler(s) 170 (e.g., via new website client 114). A centralized or a distributed determination may be made (e.g., by any new website client 114 or new website service 152) using information from any other component(s) in a new website system.

Example operation of various examples shown in and discussed relative to FIG. 1 are discussed with respect to FIGS. 2-6.

Figure 2:
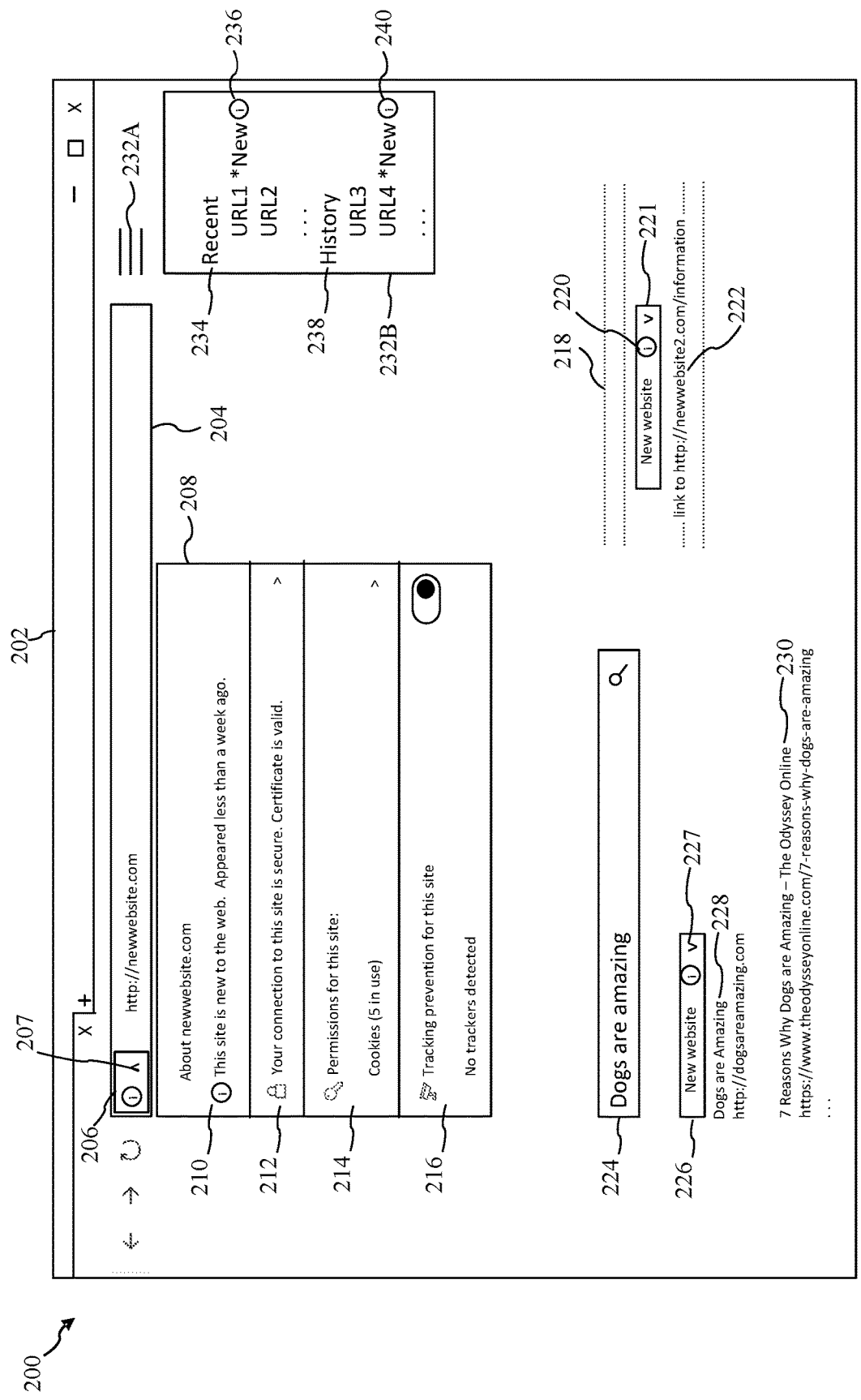
FIG. 2 shows examples of providing alerts and information for websites new to the web, according to an example embodiment.

FIG. 2 shows examples of providing alerts and information for websites new to the web, according to an example embodiment. FIG. 2 shows example 200, where an example of digital media content (e.g., webpage content) may be presented (e.g., displayed) within graphical user interface (GUI) 202 generated by web browser 112A-N. Example 200 shows several examples. Other examples may be implemented.

A first example in FIG. 2 shows a website (newwebsite.com) in address bar 204. The website (newwebsite.com) may or may not be rendered in web browser GUI 202. In other words, user 112A-N may have typed newwebsite.com into address bar 204 and may or may not have pressed "enter" to cause the web browser to request the contents of newwebsite.com from web server(s) 140. Web browser 112A-N and/or new website client 114A-N may perform anticipatory operations (e.g., prior to presentation in web browser GUI 202), concurrent operations (during a request for newwebsite.com contents) and/or reactionary operations (e.g., after presentation of newwebsite.com in web browser GUI 202) to obtain website information about newwebsite.com. In the example shown, newwebsite.com has been determined to be new to the web. A new to the web alert 206 has been generated, shown as a new to the web information icon with a control element 207 that user(s) 112A-N may interact with to show and hide new website information 208. New website information 208 may be shown with other (e.g., additional) information.

As shown by example in FIG. 2, new website information 208 is shown with four sections of information about newwebsite.com, including newwebsite.com information 210, connection information 212, permission information 214 and tracking information 216. Newwebsite.com information 210 may include, for example, an indication that newwebsite.com is new to the web and/or information about why newwebsite.com is deemed new to the web, such as an indication that newwebsite.com appeared on the web within a time threshold (e.g., less than a week ago). Connection information 212 may indicate, for example, whether a connection to newwebsite.com is secure and/or whether a website certificate is valid or invalid. Permission information 214 may indicate, for example, how many website cookies are in use for permissions to use newwebsite.com. Tracking information 216 may indicate, for example, whether tracking prevention is enabled or disabled and/or whether trackers (e.g., tracking cookies) are blocked for newwebsite.com.

A second example in FIG. 2 shows a first (e.g., search query) portion of newwebsite.com presented (e.g., rendered or displayed) on browser GUI 202. A query (e.g., "Dogs are amazing") is entered in search engine query box 224. The example shows query results below query box 224. For example, user computing device 110A may have provided the query to search engine(s) 150 and received results. The example shows two of many results to the query, including first link 228 to a first webpage, dogsareamazing.com, and second link 230 to a second webpage, theodysseyonline.com/7-reasons-why-dogs-are-amazing. The websites (e.g., URLs or domains) in search results have been evaluated (e.g., by new website service 152 and/or new website client 114) to determine whether any websites are new to the web. A new to the web alert 226 is shown associated with first link 228. New to the web alert 226 is shown as a new to the web information icon with a control element 227 that user(s) 112A-N may interact with to show and hide new website information (not shown).

A third example in FIG. 2 shows second portion 218 of webpage newwebsite.com presented (e.g., rendered or displayed) on browser GUI 202. Second portion 218 may include, for example, text, graphics, etc. Second portion 218 may include one or more links to one or more webpages in one or more websites that user(s) 116A-N may select for presentation in a current tab, a new tab or a new window of web browser GUI 202. First link 222 shown in second portion 218 is webpage URL newwebsite2/information. Web browser 112A-N, new website client 114A, new website client 114 (e.g., in proxy server(s) 130) may have identified first link 222 and determined (e.g., with or without support by new website service 152) that newwebsite2.com is new to the web. A new to the web alert 220 is shown associated with webpage URL newwebsite2.com/information. New to the web alert 220 is shown as a new to the web information icon with a control element 221 that user(s) 112A-N may interact with to show and hide new website information (not shown).

A fourth example in FIG. 2 shows drop down menu icon 232A in browser GUI 202. User selection of drop down menu icon 232A may result in display of open drop down menu 232B. Open dropdown menu 232B may show recent websites 234 and/or website history 238. New website detection(s) and indication(s) may be applied to recent websites 234 and/or website history 238. For example, webpage URL1 in recent websites 234 may be detected and identified as new and webpage URL4 in website history URL4 may be detected and identified as new. Web browser 112A-N, new website client 114A, new website client 114 (e.g., in proxy server(s) 130) may have identified webpage links URL1, URL2, etc. in recent websites 234 and/or webpage links URL3, URL4, etc. in website history 238 and determined (e.g., with or without support by new website service 152) that websites associated with URL1 and URL4 are new to the web. New to the web alert 236 is shown associated with webpage URL1. New to the web alert 236 is shown as a new to the web information icon with or without a control element that user(s) 112A-N may interact with to show and hide new website information (not shown). New to the web alert 240 is shown associated with webpage URL4. New to the web alert 240 is shown as a new to the web information icon with or without a control element that user(s) 112A-N may interact with to show and hide new website information (not shown).

Users A-N may use new to web alerts to make decisions, such as determine whether to investigate (e.g., by reviewing new website information), determine whether to stay or navigate away from a webpage (e.g., newwebsite.com), determine whether to select or not select links (e.g., dogsareamazing.com or newwebsite2.com/information), determine whether to provide personal information to a new website, determine whether to make a purchase from a new website, whether to indicate to (e.g., program) a web browser to block one or more (e.g., all) new websites. Automated determinations may be based on new website designations, such as blocking new websites from being displayed and/or enforcement of special rules for display and/or interaction with new websites, which may be based on default or user customized settings for browser operation.

Figure 3:
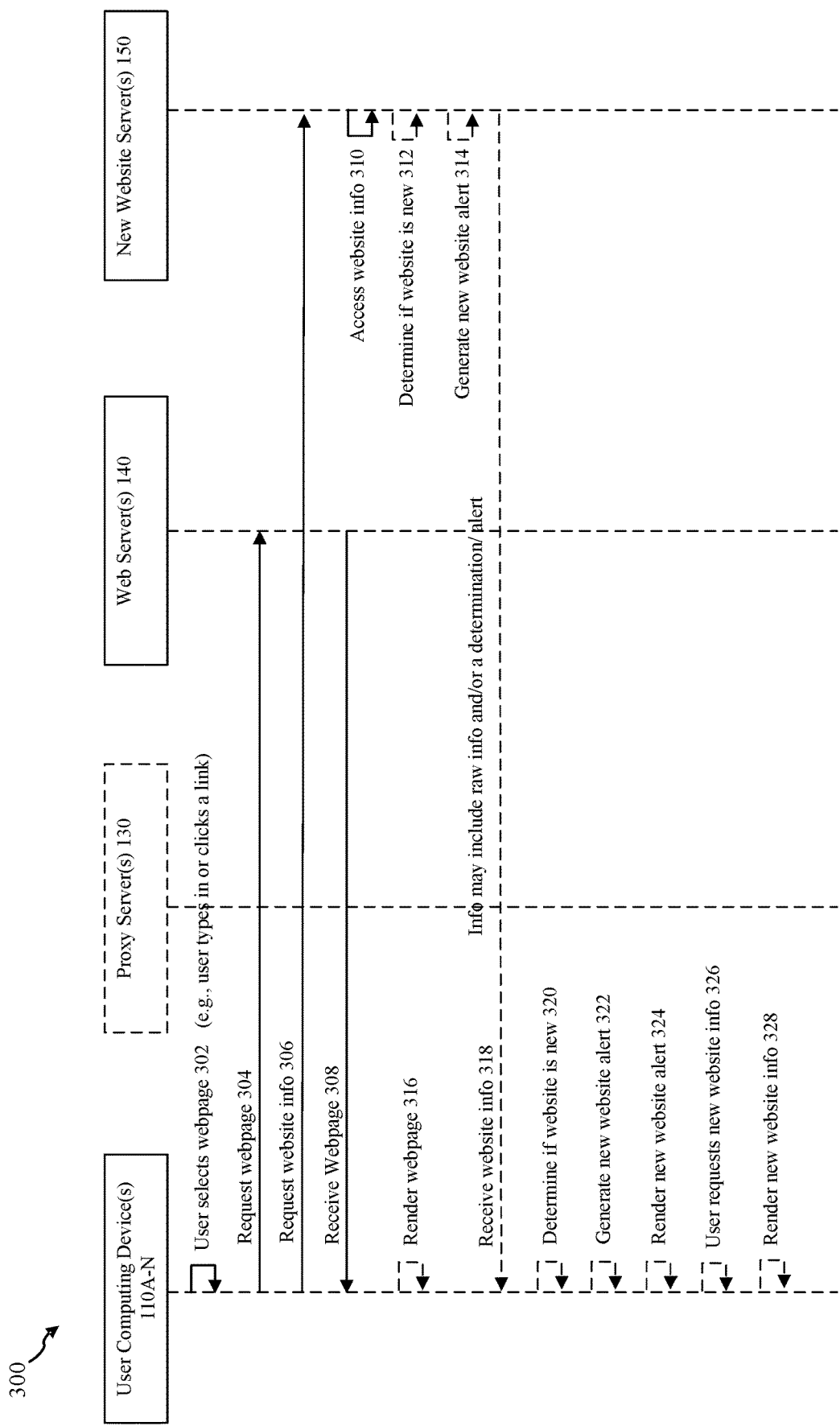
FIG. 3 shows an interaction diagram for an example method for identifying and providing alerts for websites new to the web, according to an example embodiment.

FIG. 3 shows an interaction diagram for an example method for identifying and providing alerts for websites new to the web, according to an example embodiment. Example interaction diagram 300 shows several of many possible example implementations of new to the web identification procedures. Example interaction diagram 300 is discussed with reference to the several examples of new to the web identification procedures shown in FIG. 1. Embodiments disclosed herein and other embodiments may operate in accordance with example interaction diagram 300. Example interaction diagram 300 comprises example steps 302-328. However, other embodiments may operate according to other interactions, with the same, different, more or fewer interaction participants and/or steps. There is no requirement that an interaction embodiment implement all of the interaction participants or steps illustrated in FIG. 3. Other structural and operational embodiments will be apparent to persons skilled in the relevant art(s) based on the discussion of embodiments. No order of steps is required unless expressly indicated or inherently required. Dashed lines show optional or alternative steps that may or may not be implemented in various examples. For example, proxy server(s) 130 may or may not be in communication with computing device(s) 110A-N. Utilization of proxy server(s) 130 may result in additional steps and/or shifting of one or more steps from user computing device 110A to proxy server(s) 130.

At 302, a user may select a webpage. For example, user 116A may use user computing device 110A to type a URL into address bar 204 of web browser GUI 202 and press enter or select a link shown in a web browser, such as a link in a webpage, a link in a browser history or a link in a list of recently visited or recently closed webpages.

At 304, user computing device 110A may request the selected webpage from web server(s) 140.

At 306, user computing device 110A may request information about the selected webpage from new website server(s) 150.

At 308, user computing device 110A may receive the requested webpage from web server(s) 140.

At 310, which may occur before, during or after 308 in various implementations, new website server(s) 150 may access website information in response to the request at 306. As previously indicated, new website server(s) (e.g., via new website service 152) may cache or store website information (e.g., in local or remote storage) and/or may query website information from one or more sources (e.g., search engine(s) 160, web crawler(s) 170, and/or website information server(s) 180).

At 312, new website server(s) 150 may determine whether the one or more websites are new to the web. New website server(s) 150 may analyze website information accessed at 310. For example, new website service 152 may use the accessed or retrieved information to determine whether a website is new to the web. Various implementations may use different logic for determining whether a website is new to the web. For example, one or more of the following determinations may be factored into a determination whether a website is new to the web.

For example, new website server(s) 150 (e.g., new website service 152) may access information to determine when a domain (e.g., name) for a website was (e.g., originally) purchased. A recently purchased web domain may indicate a website is new to the web. Domain purchase information may be obtained, for example, from website information server(s) 180 (e.g., whois.com).

New website server(s) 150 (e.g., new website service 152) may access information to determine when a domain for a website was transferred from a former owner to a current owner. A recently transferred web domain may indicate a website is new to the web, at least in terms of ownership. Domain transfer information may be obtained, extracted or inferred, for example, from website information server(s) 180 (e.g., whois.com).

New website server(s) 150 (e.g., new website service 152) may access information to determine the reputation of a website. For example, the lack of a reputation may indicate a website is new to the web. Reputation information for websites may be obtained, for example, from search engine(s) 160 (e.g., Microsoft® Bing®).

New website server(s) 150 (e.g., new website service 152) may access information to determine an amount of network traffic associated with a website. For example, little to no network traffic may indicate a website is new to the web.

New website server(s) 150 (e.g., new website service 152) may access other information to determine whether a website is new to the web. For example, new website server(s) 150 may access an application or service that identifies harmful websites (e.g., Microsoft® SmartScreen®) for information about a website. A lack of available information about a website from such an application or service may support an inference or a probability with a confidence level that a website is new to the web.

At 314, new website server(s) 150 may generate a new website alert. An alert may be based on a determination that a website is new at 312.

At 316, which may occur before, during or after 310, 312 and/or 314 or before, during or after 320, 322 and/or 324 in various implementations, the webpage received at 308 may be rendered (e.g., presented in web browser GUI 202) by user computing device 110A. A webpage may be rendered with or without new website information, which may include one or more new website determinations and/or alerts, for example, based on the order of implementation (e.g., whether 316 occurs before, during or after 310, 312 and/or 314 or before, during or after 320, 322 and/or 324).

At 318, website information may be received by user computing device 110A from new website server(s) 150. Website information may include information about websites that may or may not be new to the web. Information in website information may depend on the implementation, such as whether new website service 152, new website client 114, web browser 112A is making the determination whether website information indicates one or more websites are new to the web. In some examples, website information may include information (e.g., only) about new websites, for example, if new website service 152 determines whether website information indicates one or more websites are new to the web. Determinations by new website service 152 may avoid transmission of otherwise unnecessary information about non-new websites over network(s) 120 to entities requesting website information. Website information may (e.g., expressly or impliedly) include new website information, one or more new website determinations and/or new website alerts. For example, an acknowledgement without website information may impliedly indicate that no websites are new to the web.

At 320, user computing device 110A may (e.g., as an alternative to 312) determine whether a website is new to the web. Website information provided/received at 318 may include sufficient information for new website client 114A to determine whether one or more websites are new to the web, e.g., similar to the determination (e.g., if made) at 312.

At 322, user computing device 110A may (e.g., as an alternative to 314) generate one or more new website alerts for one or more websites determined to be new to the web (e.g., by new website service 152 or new website client 114A). A new website alert may not be generated (e.g., or rendered) for websites that are not new to the web.

At 324, user computing device 110A may render one or more new website alerts (e.g., generated by new website service 152 or new website client 114A). Presentation of alerts may vary among implementations. An example of a rendered alert is shown in FIG. 2 (e.g., example alerts 206, 226, 220). Other examples of an alert may include a message, for example, "This website is brand new to the web, welcome!" A new website message may be neutral, negative (e.g., cautionary), or positive in tone.

At 326, a user may (e.g., expressly or impliedly) request new website information. In an example, user 110A may express interest in new website information by interacting with alert 206. For example, user 110A may hover a cursor over or click on control element 207 to indicate interest in reviewing new website information.

At 328, new website information may be rendered. For example, as shown in FIG. 2, user interaction with control element 207 may result in display of new website information 208.

Figure 4:
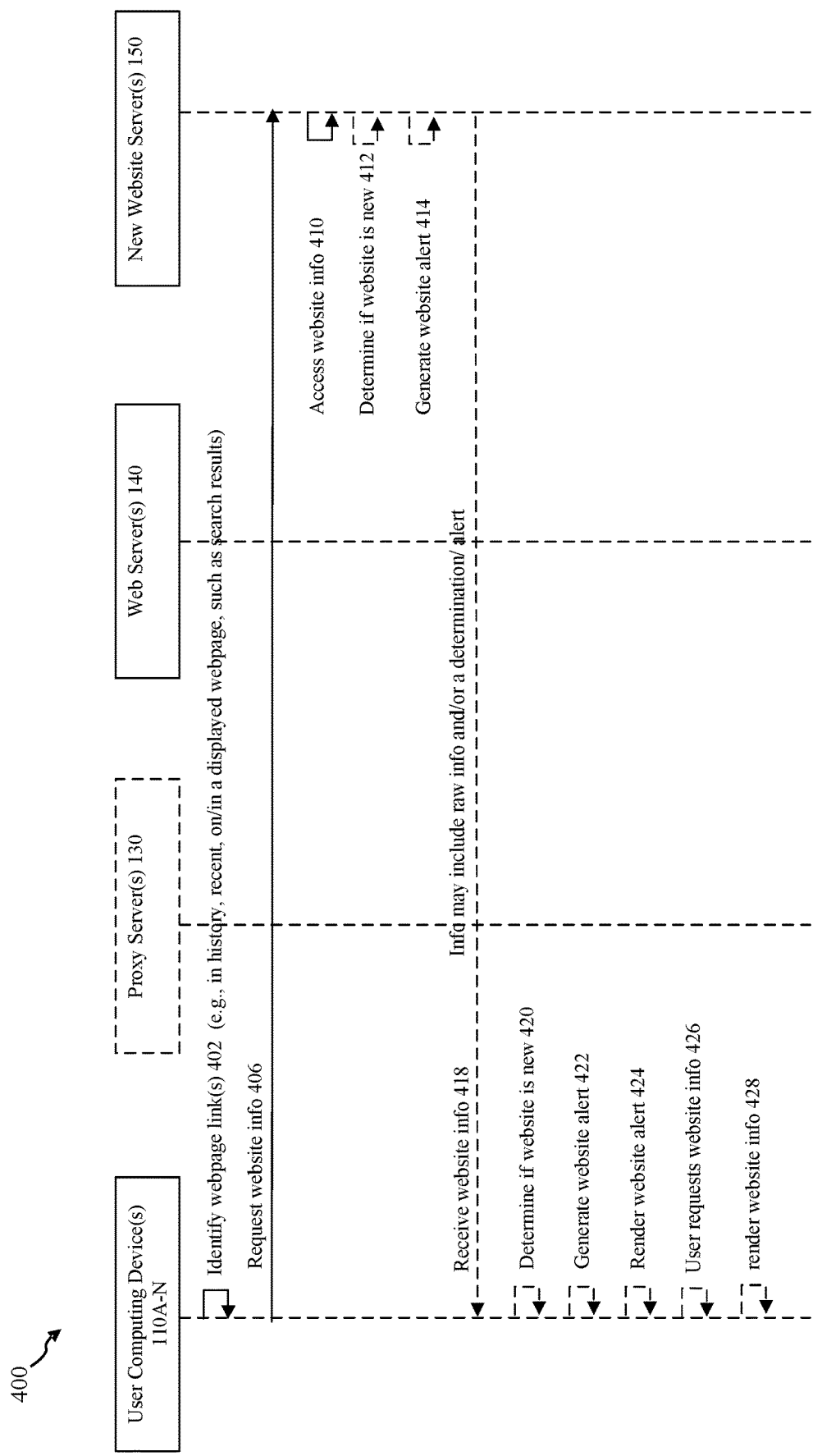
FIG. 4 shows an interaction diagram for an example method for identifying and providing alerts for websites new to the web, according to an example embodiment.

FIG. 4 shows an interaction diagram for an example method for identifying and providing alerts for websites new to the web, according to an example embodiment. Example interaction diagram 400 shows several of many possible example implementations of new to the web identification procedures. Example interaction diagram 400 is discussed with reference to the several examples of new to the web identification procedures shown in FIG. 1. Embodiments disclosed herein and other embodiments may operate in accordance with example interaction diagram 400. Example interaction diagram 400 comprises example steps 402-428. However, other embodiments may operate according to other interactions, with the same, different, more or fewer interaction participants and/or steps. There is no requirement that an interaction embodiment implement all of the interaction participants or steps illustrated in FIG. 4. Other structural and operational embodiments will be apparent to persons skilled in the relevant art(s) based on the discussion of embodiments. No order of steps is required unless expressly indicated or inherently required. Dashed lines show optional or alternative steps that may or may not be implemented in various examples. For example, proxy server(s) 130 may or may not be in communication with computing device(s) 110A-N. Utilization of proxy server(s) 130 may result in additional steps and/or shifting of one or more steps from user computing device 110A to proxy server(s) 130.

At 402, user computing device 110A (e.g., web browser 112A or new website client 114A) may identify one or more links to one or more webpages. For example, as shown in FIG. 2, link 222 and/or search result links 228 and 230 may be identified as links to one or more webpages associated with one or more websites. In other examples, one or more links shown in a browser history and/or a list of recently-visited or recently-closed webpages may be identified.

At 406, user computing device 110A may request information about the one or more identified webpage links from new website server(s) 150.

At 410, new website server(s) 150 may access website information in response to the request at 406. As previously indicated, new website server(s) (e.g., via new website service 152) may cache or store website information (e.g., in local or remote storage) and/or may query website information from one or more sources (e.g., search engine(s) 160, web crawler(s) 170, and/or website information server(s) 180).

At 412, new website server(s) 150 may determine whether the one or more websites are new to the web. New website server(s) 150 may analyze website information accessed at 410. For example, new website service 152 may use the accessed or retrieved information to determine whether a website is new to the web. Various implementations may use different logic for determining whether a website is new to the web. For example, one or more of the following determinations may be factored into a determination whether a website is new to the web.

For example, new website server(s) 150 (e.g., new website service 152) may access information to determine when a domain (e.g., name) for a website was (e.g., originally) purchased. A recently purchased web domain may indicate a website is new to the web. Domain purchase information may be obtained, for example, from website information server(s) 180 (e.g., whois.com).

New website server(s) 150 (e.g., new website service 152) may access information to determine when a domain for a website was transferred from a former owner to a current owner. A recently transferred web domain may indicate a website is new to the web, at least in terms of ownership. Domain transfer information may be obtained, extracted or inferred, for example, from website information server(s) 180 (e.g., whois.com).

New website server(s) 150 (e.g., new website service 152) may access information to determine the reputation of a website. For example, the lack of a reputation may indicate a website is new to the web. Reputation information for websites may be obtained, for example, from search engine(s) 160 (e.g., Microsoft Bing).

New website server(s) 150 (e.g., new website service 152) may access information to determine network traffic associated with a website. For example, little to no network traffic may indicate a website is new to the web.

New website server(s) 150 (e.g., new website service 152) may access other information to determine whether a website is new to the web. For example, new website server(s) 150 may access an application or service that identifies harmful websites (e.g., Microsoft® SmartScreen®) for information about a website. A lack of available information about a website from such an application or service may support an inference or a probability with a confidence level that a website is new to the web.

At 414, new website server(s) 150 may generate a new website alert. An alert may be based on a determination that a website is new at 412.

At 418, website information may be received by user computing device 110A from new website server(s) 150. Website information may include information about websites that may or may not be new to the web. Information in website information may depend on the implementation, such as whether new website service 152, new website client 114, or web browser 112A is making the determination whether website information indicates one or more websites are new to the web. In some examples, website information may include information (e.g., only) about new websites, for example, if new website service 152 determines whether website information indicates one or more websites are new to the web. Determinations by new website service 152 may avoid transmission of otherwise unnecessary information about non-new websites over network(s) 120 to entities requesting website information. Website information may (e.g., expressly or impliedly) include new website information, one or more new website determinations and/or new website alerts. For example, an acknowledgement without website information may impliedly indicate that no websites are new to the web.

At 420, user computing device 110A may (e.g., as an alternative to 412) determine whether a website is new to the web. Website information provided/received at 418 may include sufficient information for new website client 114A to determine whether one or more websites are new to the web, e.g., similar to the determination (e.g., if made) at 412.

At 422, user computing device 110A may (e.g., as an alternative to 414) generate one or more new website alerts for one or more websites determined to be new to the web (e.g., by new website service 152 or new website client 114A). A new website alert may not be generated (e.g., or rendered) for websites that are not new to the web.

At 424, user computing device 110A may render one or more new website alerts (e.g., generated by new website service 152 or new website client 114A). Presentation of alerts may vary among implementations. An example of a rendered alert is shown in FIG. 2 (e.g., example alerts 206, 226, 220).

At 426, a user may (e.g., expressly or impliedly) request new website information. In an example, user 110A may express interest in new website information by interacting with alert 206. For example, user 110A may hover a cursor over or click on control element 207 to indicate interest in reviewing new website information.

At 428, new website information may be rendered. For example, as shown in FIG. 2, user interaction with control element 207 may result in display of new website information 208.

Implementations are not limited to the examples shown. Example system 100 or components therein, and/or other systems and components in other examples may operate, for example, according to example interaction diagrams and methods presented in FIGS. 3 and 4.

Figure 5:
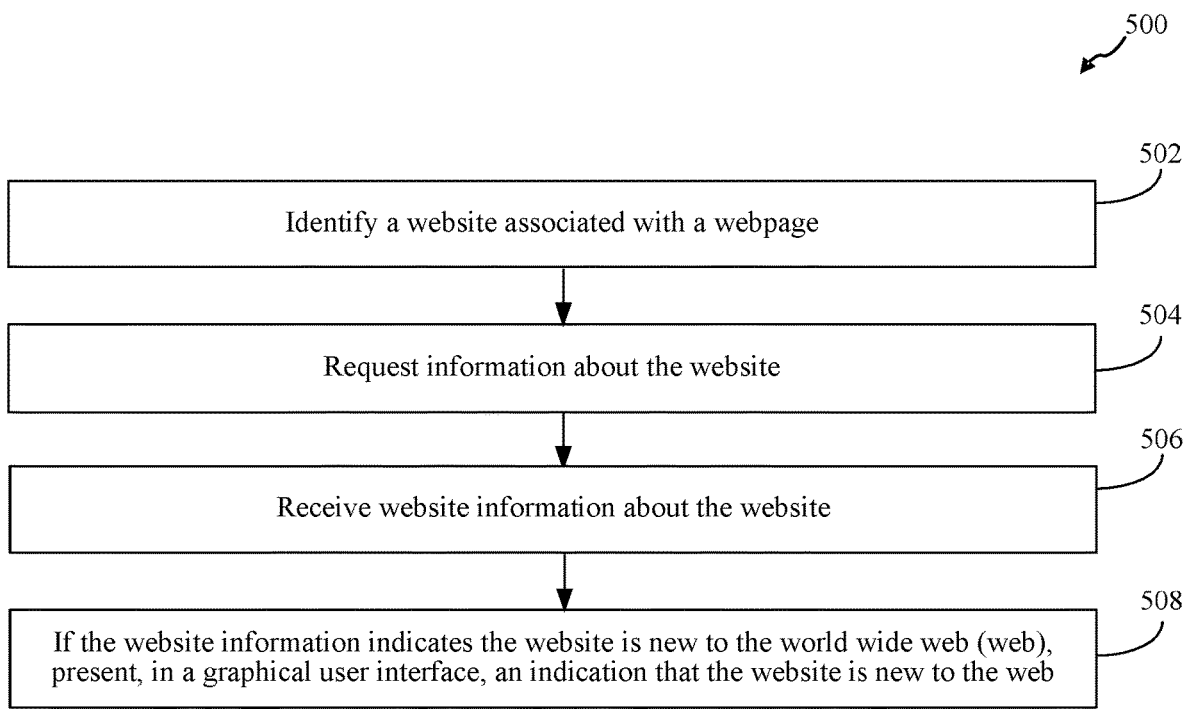
FIG. 5 shows a flowchart of an example method for identifying and providing alerts for websites new to the web, according to an example embodiment.

Embodiments may be implemented in processes or methods. For example, FIG. 5 shows a flowchart of an example method for identifying and providing alerts for websites new to the web, according to an example embodiment. Embodiments disclosed herein and other embodiments may operate in accordance with example method 500. Method 500 comprises steps 502-508. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 5. FIG. 5 is simply one of many possible embodiments. Embodiments may implement fewer, more or different steps.

In step 502, a website associated with a webpage may be identified. For example, as shown in FIG. 1, new website client 114 (e.g., new website client 114A) or web browser 112A may (e.g., at 302 in FIG. 3 or 402 in FIG. 4) identify, as shown in FIG. 2, websites associated with webpages newwebsite.com, dogsareamazing.com, theodysseyonline.com/7-reasons-why-dogs-are-amazing, and/or newwebsite2.com/information.

In step 504, information about the identified website(s) may be requested. For example, as shown in FIG. 1, user computing device 110A, based on operation(s) by new website client 114 (e.g., new website client 114A) or web browser 112A, may (e.g., at 306 in FIG. 3 or 406 in FIG. 4) request, as shown in FIG. 2, information about the websites associated with webpages newwebsite.com, dogsareamazing.com, theodysseyonline.com/7-reasons-why-dogs-are-amazing, and/or newwebsite2.com/information.

In step 506, information about the identified website(s) may be received. For example, as shown in FIG. 1, user computing device 110A may receive for new website client 114 (e.g., new website client 114A) or web browser 112A, as shown at 318 in FIG. 3 or 418 in FIG. 4, information about the websites associated with webpages newwebsite.com, dogsareamazing.com, theodysseyonline.com/7-reasons-why-dogs-are-amazing, and/or newwebsite2.om/information. Website information may include information about websites that may or may not be new to the web. Information in website information may depend on the implementation, such as whether new website service 152, new website client 114, web browser 112A is making the determination whether website information indicates one or more websites are new to the web. In some examples, website information may include information (e.g., only) about new websites, for example, if new website service 152 determines whether website information indicates one or more websites are new to the web. Determinations by new website service 152 may avoid transmission of otherwise unnecessary information about non-new websites over network(s) 120 to entities requesting website information. Website information may (e.g., expressly or impliedly) include new website information, one or more new website determinations and/or new website alerts. For example, an acknowledgement without website information may impliedly indicate that no websites are new to the web.

In step 508, an indication that the website is new to the world wide web (web) may be presented in a graphical user interface if the website (e.g., associated with a webpage) information indicates the website is new to web. For example, as shown in FIG. 1, user computing device 110A, based on operation(s) by new website client 114 (e.g., new website client 114A) or web browser 112A, may (e.g., as shown at 324 in FIG. 3 or 424 in FIG. 4), render a new website alert. Examples of new website alerts are shown in FIG. 2 as new website alerts 206, 226 and 220.

Figure 6:
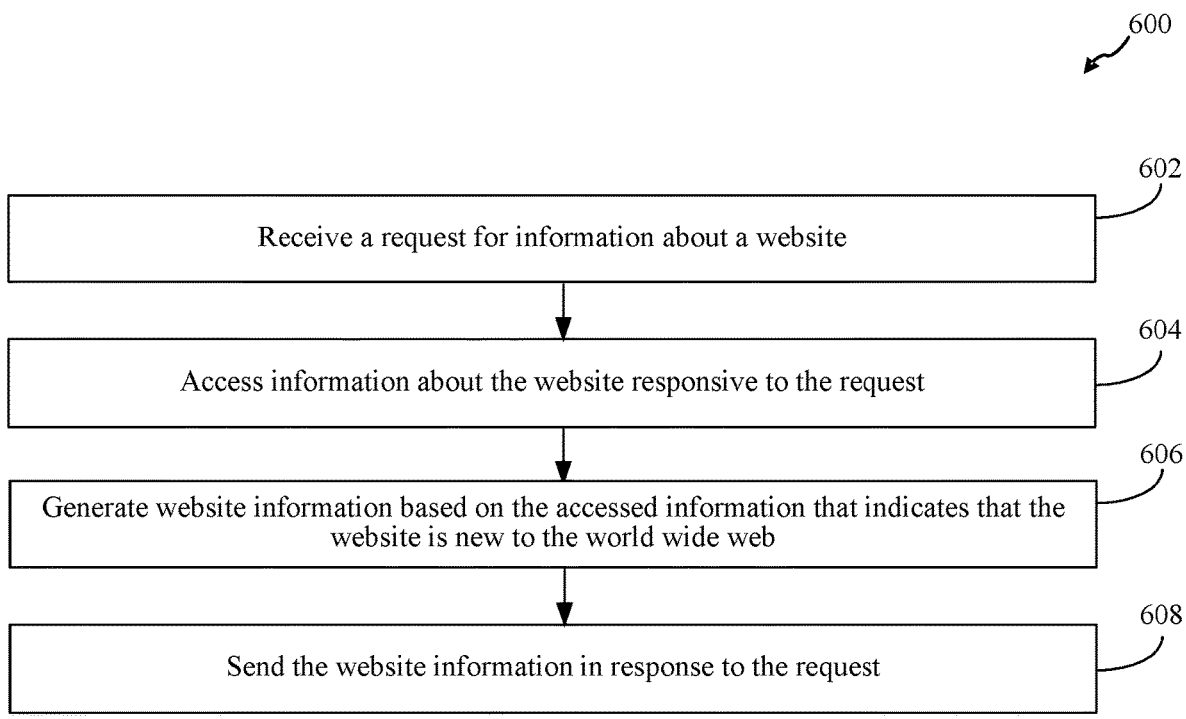
FIG. 6 shows a flowchart of an example method for identifying and providing alerts for websites new to the web, according to an example embodiment.

FIG. 6 shows a flowchart of an example method for identifying and providing alerts for websites new to the web, according to an example embodiment. Embodiments disclosed herein and other embodiments may operate in accordance with example method 600. Method 600 comprises steps 602-608. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 6. FIG. 6 is simply one of many possible embodiments. Embodiments may implement fewer, more or different steps.

In step 602, a request for information about a website (e.g., associated with a webpage) may be received. For example, as shown in FIG. 1, new website server(s) 150 (e.g., via new website service 152) may (e.g., at 306 in FIG. 3 or 406 in FIG. 4) receive, as shown in FIG. 2, a request for information about websites associated with webpages newwebsite.com, dogsareamazing.com, theodysseyonline.com/7-reasons-why-dogs-are-amazing, and/or newwebsite2.com/information.

In step 604, information about the website(s) may be accessed in response to the request. For example, as shown in FIG. 1, new website server(s) 150 (e.g., via new website service 152) may (e.g., as shown at 310 in FIG. 3 or 410 in FIG. 4) access information about the websites associated with webpages newwebsite.com, dogsareamazing.com, theodysseyonline.com/7-reasons-why-dogs-are-amazing, and/or newwebsite2.com/information. The website information may be accessed in memory (e.g., cache) or storage and/or requested from one or more sources, such as search engine(s) 150, web crawler(s) 160 and/or website information server(s) 160.

In step 606, information about the identified website(s) may be generated based on the accessed information, which may indicate that one or more websites are new to the web. For example, as shown in FIG. 1, new website server(s) 150 (e.g., via new website service 152) may (e.g., as shown at 312, 314 in FIG. 3 or 412, 414 in FIG. 4) generate website information about the websites associated with webpages newwebsite.com, dogsareamazing.com, theodysseyonline.com/7-reasons-why-dogs-are-amazing, and/or newwebsite2.com/information. Website information may include information about websites that may or may not be new to the web. Information in website information may depend on the implementation, such as whether new website service 152, new website client 114, web browser 112A is making the determination whether website information indicates one or more websites are new to the web. In some examples, website information may include information (e.g., only) about new websites, for example, if new website service 152 determines whether website information indicates one or more websites are new to the web. Determinations by new website service 152 may avoid transmission of otherwise unnecessary information about non-new websites over network(s) 120 to entities requesting website information. Website information may (e.g., expressly or impliedly) include new website information, one or more new website determinations and/or new website alerts. For example, an acknowledgement without website information may impliedly indicate that no websites are new to the web.

In step 608, the website information generated may be sent in response to the request for information. For example, as shown in FIG. 1, new website server(s) 150 (e.g., via new website service 152) may (e.g., as shown at 318 in FIG. 3 or 418 in FIG. 4) send to user computing device 110A the website information generated for the websites associated with webpages newwebsite.com, dogsareamazing.com, theodysseyonline.com/7-reasons-why-dogs-are-amazing, and/or newwebsite2.com/information.

In some embodiments, automated determinations may be based on new website designations, whether such designations are made by new website service 152, new website client 114, or new website clients 114A-114N. For example, in response to a new website designation, any of web browser 112A-112N, new website client 114A-114N, proxy server(s) 130, web server(s) 140 or search engine(s) 160 may cause new websites to be blocked from being displayed or identified to a user. Likewise, in response to a new website designation, any of these entities may activate and/or enforce special rules for display and/or interaction with new websites. Such rules may be based on default or user customized settings for browser operation.

III. Example Computing Device Embodiments

As noted herein, the embodiments described, along with any modules, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
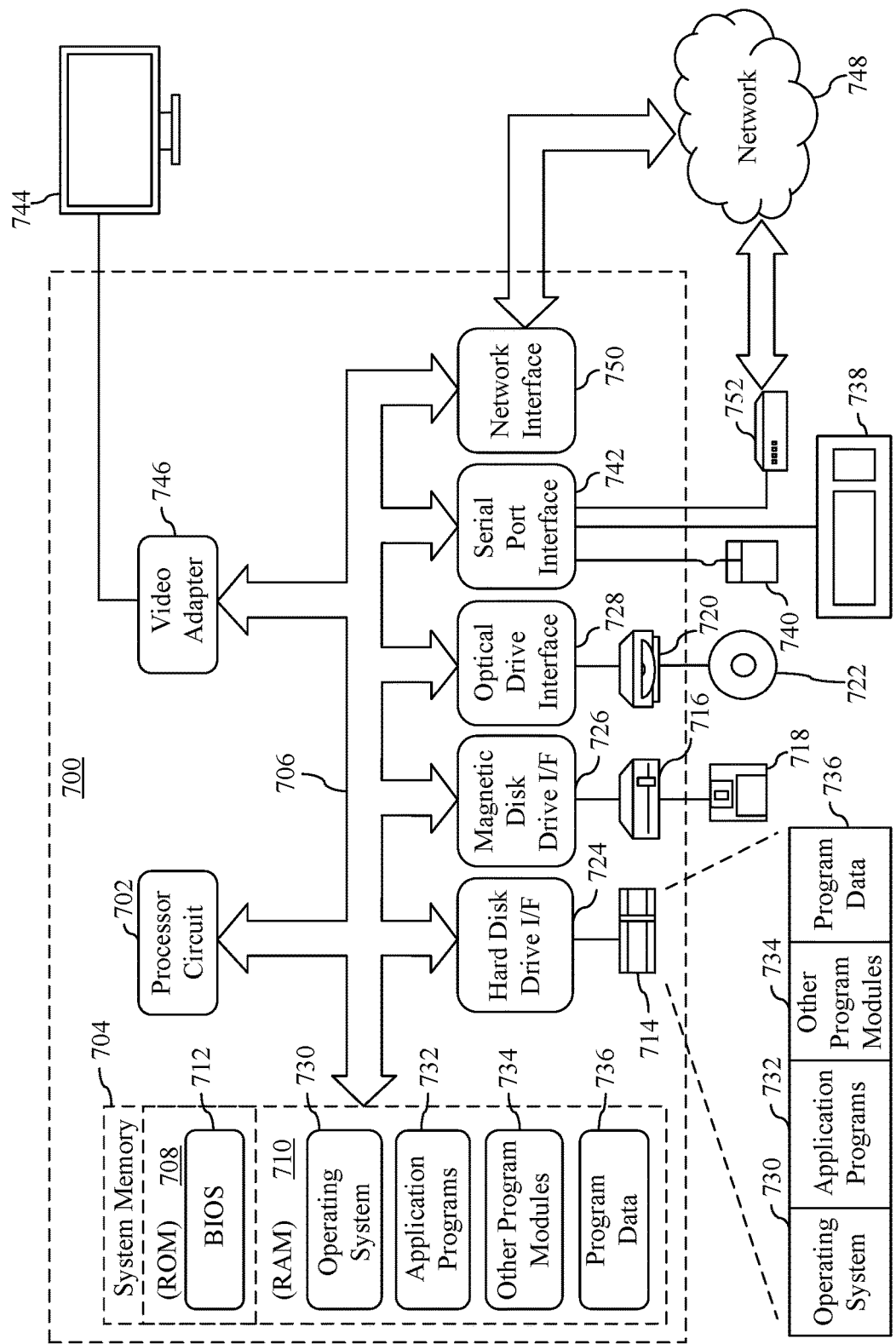
FIG. 7 shows a block diagram of an example computing device that may be used to implement example embodiments.

FIG. 7 shows an exemplary implementation of a computing device 700 in which example embodiments may be implemented. Consistent with all other descriptions provided herein, the description of computing device 700 is a non-limiting example for purposes of illustration. Example embodiments may be implemented in other types of computer systems, as would be known to persons skilled in the relevant art(s). Computing device 700 may comprise, for example, an implementation of any one of user computing device(s) 110A-N, proxy server(s) 130, web server(s) 140, new website server(s) 150, search engine(s) 160, web crawler(s) 170, and/or website information server(s) 180, as described above in reference to FIG. 1.

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing any of the components shown in FIG. 1 (e.g., web browser 112, new website client 114, new website service 152), any of the operations shown in interaction diagrams depicted in FIGS. 3 and 4, and any of the steps of the flowcharts depicted in FIGS. 5 and 6.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of example embodiments described herein. Accordingly, such computer programs represent controllers of the computing device 700.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

Methods, systems and computer program products are provided for distinguishing websites new to the web from other websites. A web browser may identify and alert a user to websites that are new to the web, for example, based on a purchase date, a transfer of ownership date, network traffic to the website, a reputation of the website, and/or appearance of the website in search results. An alert may be provided before, during and/or after a user navigates to a website. Websites and/or links to websites may be accessed in a browser, for example, based on browser website navigation (e.g., user entry or selection of websites), website links shown in displayed websites, search query results (e.g., provided by a search engine), a history of website browsing, a list of recently browsed websites, etc. Websites and website links may be identified for determination as to whether they are new, for example, by a browser, a browser plugin, a proxy, a search engine, etc. A new website service may provide support to browsers, browser plugins, proxy servers, search engines, etc. An alert may be provided for a current (e.g., displayed) website. One or more alerts may be provided for one or more links to websites in a displayed webpage, such as search engine results. One or more alerts may be provided for one or more links to websites shown in history or recent websites In some cases, a new to the web label may alert a user to consider whether a website is malicious, aiding a user's determination whether to navigate away from or to avoid navigating to websites.

In examples, a new to the web identification and alert system may comprise, for example, one or more processors; and one or more memory devices that store program code configured to be executed by the one or more processors to perform a method comprising: identifying a website associated with a webpage; requesting information about the website; receiving website information about the website; and if the website information indicates the website is new to the world wide web (web), presenting, in a graphical user interface, an indication that the website is new to the web. In some examples, the program code may comprise a new website client configured to identify a website associated with a webpage, request information about the website from a new website server, and receive website information about the website from the new website server; and a web browser configured to present, in a graphical user interface, an indication that the website is new to the world wide web (web) if the website information indicates the website is new to the web.

A system may (e.g., further) comprise one or more memory devices that store program code configured to be executed by the one or more processors to perform a method comprising, for example, determining whether the website is new to the web based on the website information. In some examples, the new website client may be (e.g., further) configured to determine whether the website is new to the web based on the website information.

The indication that the website is new to the web may comprise, for example, at least one of the following: an indication that the website was purchased within a purchase threshold time; an indication that the website was transferred in ownership within an ownership threshold time; an indication that the website falls below an information threshold; an indication that network traffic to the website falls below a network traffic threshold; an indication that a reputation of the website falls below a reputation threshold or that the site has no reputation; or an indication that the website has not appeared in search results.

In examples, a new to the web identification and alert method may comprise, for example, identifying a website associated with a webpage; requesting information about the website; receiving website information about the website; and if the website information indicates the website is new to the world wide web (web), presenting, in a graphical user interface, an indication that the website is new to the web.

Presenting the indication that the website is new to the web may comprise, for example, associating the indication with a display of a webpage link for the webpage.

Presenting the indication that the website is new to the web may comprise, for example, associating the indication with a display of the webpage.

The indication that the website is new to the web may comprise, for example, at least one of the following: an indication that the website was purchased within a purchase threshold time; an indication that the website was transferred in ownership within an ownership threshold time; an indication that the website falls below an information threshold; an indication that network traffic to the website falls below a network traffic threshold; an indication that a reputation of the website falls below a reputation threshold or that the site has no reputation; or an indication that the website has not appeared in search results.

A method may (e.g., further) comprise, for example, determining whether the website is new to the web based on the website information.

A method may (e.g., further) comprise, for example, associating at least a portion of the website information with the indication; and presenting, in the graphical user interface, the at least a portion of the website information.

Identifying the website associated with the webpage may comprise, for example, receiving a selection of the webpage based on a user selection of a link presented in the graphical user interface or based on user entry of a web address for the webpage in the graphical user interface.

Identifying the website associated with the webpage may comprise, for example, identifying a link to the webpage in search results presented in the graphical user interface.

Identifying the website associated with the webpage may comprise, for example, identifying a link to the webpage in a browser history or a list of recently accessed webpages presented in the graphical user interface.

In examples, a method performed by one or more computing devices, may comprise, for example, receiving a request for information about a website; accessing information about the website responsive to the request; generating website information based on the accessed information that indicates that the website is new to the world wide web (web); and sending the website information in response to the request.

The website information may indicate that the website is new to the web, for example, by indicating at least one of the following: that the website was purchased within a purchase threshold time; that the website was transferred in ownership within an ownership threshold time; that the site falls below an information threshold; that network traffic to the site falls below a network traffic threshold; that a reputation of the site falls below a reputation threshold or that the site has no reputation; or that the website has not appeared in search results.

A method may (e.g., further) comprise, for example, determining that the website is new to the web based on the accessed information; and providing an indication of the determination in the website information.

A method may (e.g., further) comprise, for example, associating at least a portion of the website information with the indication.

In some examples, the request may be received from a web browser, a web browser plugin, a search engine or a proxy server.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
one or more processors; and
one or more memory devices that store program code configured to be executed by the one or more processors, the program code comprising:
a new website client configured to identify a website associated with a webpage, request information about the website from a new website server, and receive website information about the website from the new website server; and
a web browser configured to present, in a graphical user interface, an indication that the website is new to the world wide web (web) if the website information indicates the website was purchased within a purchase threshold time or was transferred in ownership within an ownership threshold time.

2. The system of claim 1, wherein the new website client is further configured to:
determine whether the website is new to the web based on the website information.

3. The system of claim 1, wherein the website information is based on domain name ownership information.

4. A method performed by a web browser executing on a computing device, the method comprising:
identifying a website associated with a webpage;
requesting information about the website;
receiving website information about the website; and
if the website information indicates the website was purchased within a purchase threshold time or was transferred in ownership within an ownership threshold time, presenting, in a graphical user interface, an indication that the website is new to the world wide web (web).

5. The method of claim 4, wherein presenting, in the graphical user interface, the indication that the website is new to the web comprises:
associating the indication with a display of a webpage link for the webpage.

6. The method of claim 4, wherein presenting, in the graphical user interface, the indication that the website is new to the web comprises:
associating the indication with a display of the webpage.

7. The method of claim 4, further comprising:
determining whether the website is new to the web based on the website information.

8. The method of claim 4, further comprising:
associating at least a portion of the website information with the indication; and
presenting, in the graphical user interface, the at least a portion of the website information.

9. The method of claim 4, wherein identifying the website associated with the webpage comprises:
receiving a selection of the webpage based on a user selection of a link presented in the graphical user interface or based on user entry of a web address for the webpage in the graphical user interface.

10. The method of claim 4, wherein identifying the website associated with the webpage comprises:
identifying a link to the webpage in search results presented in the graphical user interface.

11. The method of claim 4, wherein identifying the website associated with the webpage comprises:
identifying a link to the webpage in a browser history or a list of recently accessed webpages presented in the graphical user interface.

12. The method of claim 4, wherein the website information is based on domain name ownership information.

13. A method performed by one or more computing devices, comprising:
receiving a request for information about a website;
accessing information about the website responsive to the request;
determining, based on the accessed information, that the website was purchased within a purchase threshold time or was transferred in ownership within an ownership threshold time;
generating website information based on the accessed information that indicates that the website is new to the world wide web (web); and
sending the website information in response to the request.

14. The method of claim 13, further comprising:
determining that the website is new to the web based on the accessed information; and
providing an indication of the determination in the website information.

15. The method of claim 14, further comprising:
associating at least a portion of the website information with the indication.

16. The method of claim 13, wherein the request is received from a web browser.

17. The method of claim 13, wherein the request is received from a web browser plugin.

18. The method of claim 13, wherein the request is received from a search engine.

19. The method of claim 13, wherein the request is received from a proxy server.

20. The method of claim 13, wherein the accessed information is domain name ownership information.

* * * * *